Patented Feb. 8, 1944

2,341,288

UNITED STATES PATENT OFFICE 2,341,288

CATALYTIC OXIDATION OF KETONES

Hermann Prückner, Dessau-Rosslau, Germany, assignor, by mesne assignments, to E. I. du Pont de Nemours & Company, Wilmington, Del., a corporation of Delaware No Drawing. Application April 4, 1940, Serial No. 327,801. In Germany April 29, 1939

4 Claims. (Cl. 204—158)

It is known that ketones containing at least one hydrogen atom bound to at least one of the carbon atoms neighbouring the carbonyl group, supply carbon-acids at the oxidation in a liquid phase by means of oxygen or of an oxygen-bearing gas in the presence of an oxidation-catalyst. Thus it has been possible to convert acetone and methyl-ethyl-ketone into acetic acid, cyclohexanone into adipic acid and methyl-cyclohexanone into methyl-adipic acid. For the technical obtention of those acids and particularly of the two basic acids the long duration of the reaction is, however, of a great disadvantage especially by the fact that considerable amounts of non-desired by-products are simultaneously formed.

Now it has been found that the oxidation of ketones containing at least one hydrogen atom bound to at least one of the carbon atoms neighbouring the carbonyl group to carbon-acids, occurs in an almost quantitative yield and within a considerably shorter time in a liquid phase by means of oxygen or of an oxygen-bearing gas in the presence of an oxidation-catalyst, if we cause the reaction of oxygen or of oxygen-bearing gases upon the initial stuffs with the simultaneous radiation of same by actinic light. In doing so the light-source may be disposed either inside the reaction-space or also outside. In the latter case it is, however, necessary to have the oxidation vessel made of a material allowing short-undulated rays of passing through it, e. g., quartz.

By the radiation of the ketones with short-undulated light during the oxidation-process we not only state an acceleration of the latter, but we are also allowed to lower the reaction-temperatures to below 100° C., whereby the forming of by-products is considerably reduced. Thus, e. g., an evolution of carbonic acid occurs but to quite a little extent.

The reaction of oxygen or of oxygen-bearing gases upon ketones can be carried out either under atmospheric pressure or likewise under reduced or increased pressure. To accelerate the oxidation-process we are in a position to add known catalysts such as ammonium-vanadate, mercuric oxide, manganic acetate, to the ketones to be oxidized. As initial stuffs for the described process we consider in first line the cyclo-aliphatic ketones such as cyclo-pentanone, cyclo-hexanone, methyl-cyclo-hexanone, decalone, camphor, but the same process is likewise applicable on acetone, methyl-ethyl-ketone, di-ethyl-ketone, acetophenone, oleonone and the like. The ketones may be applied either alone or dissolved in a solvent not sensitive to oxidation such as acids or esters. The temperatures for the oxidation are between 40° and 100° C.

Example 1

Into a suitable vessel to consist of glass allowing short-undulated rays of passing through it and provided with a reflux-cooler we pour 200 grams of cyclohexanone and 0.2 gram of potassium-permanganate (dissolved in 5 cm.$^3$ of water) and 1 gram of adipic acid, whereupon we introduce air in a finely dispersed form. The oxidation is carried out at 60° to 70° C. while 20 litres of air are blown through for each hour. At the same time a radiation of the reaction-vessel is performed by means of a quartz-lamp. Already 1 to 2 hours later the contents of the reaction-vessel will have grown solid owing to the formed adipic acid. The reaction-product is then filtered off and the filtrate subjected anew to the oxidation either alone or after an addition of further amounts of cyclohexanone. In this way the yield of adipic acid from cyclohexanone is almost quantitatively obtained.

The process allows of being performed with good results also with a technic cyclohexanone containing higher amounts of cyclohexanol. If, on the contrary, we proceed under the above-indicated working-conditions but without the radiation by a quartz-lamp, there occurs no perceptible formation of adipic acid; only in increasing the temperature to at least 100° C. and in extending the reaction-duration an oxidation is obtained. This oxidation, however, occurs while forming simultaneously considerable amounts of by-products among which also carbonic acid and consequently we obtain scarcely more than 60% of the amount of adipic acid to be theoretically expected.

Example 2

By mixing 200 grams of methyl-cyclohexanone (mixture of the 3 isomeres) with 0.2 gram of silver-permanganate and by proceeding for the rest as per Example 1), we obtain a mixture of $\alpha$- and $\beta$-methyl-adipic acid in a yield of more than 90%.

Example 3

200 grams of $\beta$-decalone mixed with 10% of glacial acetic acid are oxidized in the afore-described way and after distilling off the glacial acetic acid we obtain in a very satisfactory yield an acid-mixture consisting almost entirely of cyclo-hexanone-di-acetic acid with only little portions of hexa-hydro-cinnamic-o-carbonic acid.

What I claim is:

1. In a process for producing adipic acid, the step which comprises subjecting cyclohexanone to contact with gas containing gaseous oxygen, in the liquid phase and in the presence of actinic light and an oxidation catalyst, the reaction being carried on at a temperature of from about 40 to about 100° C.

2. In a process for producing acids corresponding to the ketone treated, the step which comprises subjecting a cycloaliphatic ketone containing but one carbonyl group and containing at least one hydrogen atom bound to at least one of the carbon atoms adjacent the single carbonyl group, to contact with a gas containing gaseous oxygen, in the liquid phase and in the presence of actinic light, the process being conducted at temperatures of about 40 to about 100° C.

3. In a process for producing acids corresponding to the ketone treated, the step which comprises subjecting a cycloaliphatic ketone containing but one carbonyl group and containing at least one hydrogen atom bound to at least one of the carbon atoms adjacent the single carbonyl group, to contact with a gas containing gaseous oxygen, in the liquid phase and in the presence of actinic light, and an oxidation catalyst, the process being conducted at temperatures of about 40 to about 100° C.

4. In a process for producing acids corresponding to the ketone treated, the step which comprises subjecting a cycloaliphatic ketone containing but one carbonyl group and containing at least one hydrogen atom bound to at least one of the carbon atoms adjacent the single carbonyl group, to contact with a gas containing gaseous oxygen, in the presence of a solvent not sensitive to the oxidation and in the presence of actinic light, the process being conducted at temperatures of about 40 to about 100° C.

HERMANN PRÜCKNER.